United States Patent
Kasapi et al.

(10) Patent No.: US 7,660,276 B2
(45) Date of Patent: *Feb. 9, 2010

(54) SYSTEM AND RELATED METHODS FOR BEAMFORMING IN A MULTI-POINT COMMUNICATIONS ENVIRONMENT

(75) Inventors: Athanasios A. Kasapi, San Francisco, CA (US); Jason Liu, Toronto (CA)

(73) Assignee: Intel Corporation, Santa Clara, CA (US)

( * ) Notice: Subject to any disclaimer, the term of this patent is extended or adjusted under 35 U.S.C. 154(b) by 393 days.

This patent is subject to a terminal disclaimer.

(21) Appl. No.: 11/717,913

(22) Filed: Mar. 13, 2007

(65) Prior Publication Data

US 2007/0165552 A1   Jul. 19, 2007

Related U.S. Application Data

(63) Continuation of application No. 10/034,140, filed on Dec. 28, 2001, now Pat. No. 7,206,293.

(51) Int. Cl.
   H04H 20/71   (2008.01)
(52) U.S. Cl. .................... 370/312; 455/562.1
(58) Field of Classification Search ............ 370/312, 370/316, 320–322, 432; 455/450–452.2, 455/562.1; 342/368, 372
See application file for complete search history.

(56) References Cited

U.S. PATENT DOCUMENTS

| | | | |
|---|---|---|---|
| 6,091,953 A | 7/2000 | Ho et al. | |
| 6,122,260 A | 9/2000 | Liu et al. | |
| 6,249,680 B1 | 6/2001 | Wax et al. | |
| 6,301,238 B1 | 10/2001 | Hagerman et al. | |
| 6,377,819 B1 | 4/2002 | Gesbert et al. | |
| 6,477,160 B2 | 11/2002 | Gleeson | |
| 6,490,452 B1 | 12/2002 | Boscovic et al. | |
| 6,564,037 B1 | 5/2003 | Sweatman et al. | |
| 6,631,277 B2 | 10/2003 | Berg et al. | |
| 6,684,086 B2 | 1/2004 | Miya | |
| 6,771,987 B1 | 8/2004 | Dam et al. | |
| 6,831,904 B1 | 12/2004 | Yamao et al. | |
| 6,901,062 B2 | 5/2005 | Scherzer et al. | |
| 2003/0090418 A1 | 5/2003 | Howell | |

FOREIGN PATENT DOCUMENTS

| | | |
|---|---|---|
| EP | 0 926 916 | 6/1999 |
| WO | WO 96/22662 | 7/1996 |

OTHER PUBLICATIONS

Huang et al.: A Spatial Scheme for Downlink Beamforming in SDMA Mobile Radio, Dep't of Electrical Engineering, Penn State Univ. pp. 191-195, 3-5988-07/00.

Shek et al.: Dynamic Spatial Clustering for Intelligent Mobile Information Sharing and Dissemination, Info Sciences Lab, HRI Laboratories, Malibu, CA, Jul. 20, 1999, pp. 132-146, XP008018313.

*Primary Examiner*—Aung S Moe
*Assistant Examiner*—Kerri M Rose
(74) *Attorney, Agent, or Firm*—Blakely, Sokoloff, Taylor & Zafman LLP

(57) ABSTRACT

A system and related methods for beamforming in a multi-point communication environment is presented. According to one aspect of the invention, a method comprising identifying one or more target(s) for which a communication signal is intended, identifying one or more other target(s) which may benefit from receipt of the communication signal, and developing a multi-lobe beampattern to transmit the communication signal to the intended target(s) and the identified one or more other target(s).

18 Claims, 6 Drawing Sheets

SYSTEM AND RELATED METHODS FOR BEAMFORMING IN A MULTI-POINT COMMUNICATIONS ENVIRONMENT

RELATED APPLICATIONS

The present application is a continuation of prior application Ser. No. 10/034,140, filed Dec. 28, 2001 now U.S. Pat. No. 7,206,293.

TECHNICAL FIELD

The present invention generally relates to the field of wireless communication systems and, more particularly, to a system and related methods for beamforming in a multi-point communication environment.

BACKGROUND

Wireless communication systems are not new. Indeed, two-way radio technology dates back to the beginning of the $20^{th}$ century, while its progeny, cellular telephony systems, were first introduced in the early 70's. In traditional wireless communication systems, a wireless communication station facilitates wireless communication with remote communication device(s) (e.g., wireless subscriber units, mobile computing devices, and the like) via a wireless communication link(s). As the technology developed and the cost associated with owning and using such wireless communication devices has decreased, the popularity of the wireless telephony systems has exploded. To accommodate this growth in the subscriber base, digital cellular techniques were developed and standardized to increase user capacity of the cellular system without a commensurate increase in the radio frequency (RF) power generated within the system.

Initially, individual communication channels were defined as a carrier frequency, i.e., the so-called Frequency Division Multiple Access (FDMA) wireless systems. More recently, a number of different digital wireless communication technologies have been introduced and provide the basis for a number of wireless communication system architectures. Two primary examples of digital wireless technology are the time-division multiple access (TDMA) and code-division multiple access (CDMA) technologies.

In a TDMA system, a carrier frequency is parsed into independent incremental units of time, referred to as a timeslot, wherein each timeslot at a carrier frequency supports an independent communication session between a subscriber unit (or, handset) and a communication station (or, base station). That is, while a communication channel in a conventional analog (FDMA) communication system is commonly defined by its carrier frequency, a communication channel in a TDMA system is defined by a timeslot on a particular carrier frequency.

CDMA systems employ a broadband communication approach. In CDMA systems, a communication channel is defined by a pseudo-noise (PN) code contained in the header of digital communication packets passed between the subscriber unit and the communication station over rapidly varying signals throughout a spectrum of frequencies.

Those skilled in the art will appreciate that the wireless communication link between any two communicating entities is often the weakest portion of a communication chain, especially when the location of one or more of the entities is uncontrolled and moves. Under such circumstances, the radio link can become weak as the distance between the entities increases, or as obstacles occur in the physical path of the signal propagation. Furthermore, in the multiple access communication systems discussed above (e.g., FDMA, TDMA, CDMA, etc.) carrier frequency reuse is employed to support communication sessions among a number of geographically dispersed users. Such co-channel users are supposed to be separated geographically by sufficient distance so that their respective communication sessions do not interfere with one another. This constraint of geographic separation in frequency reuse limits the capacity of the system, and is often an imperfect guard against interference.

Adaptive array technology offers increased performance in such radio frequency (RF) networks by employing multiple antennae for radio transmission from one or more of the entities, controlling one or more of the relative phase and amplitude of the signal transmitted from each antenna within the array to spatially direct the RF energy towards desired recipients, and away from co-channel users.

This technique is very effective when the communication link is a point-to-point link, i.e., a wireless communication channel dedicated to communication between a single user terminal and a basestation, such as in conventional two-way communication systems. In an increasingly large number of wireless communication implementations, however, there is more than one intended recipient of a communication link, each of which should be able to receive the signal. An example of just such an implementation is the general packet radio service, or GPRS.

Those skilled in the art will appreciate that GPRS, as originally conceived, is implemented over a TDMA-based wireless communication system, wherein up to eight different users may selectively share a communication channel. From the end-user perspective, the GPRS service managed by a GPRS-enabled communication station provides a virtual packet-switched network utilizing circuit-switched communication resources of the TDMA system. Those skilled in the art will appreciate that a packet-based communication systems such as the GPRS facilitate the so-called "always on" connection to services via the communication link. In as much as conventional adaptive array techniques were derived in the context of a point-to-point communication link, it has been thought that two-way, multi-point, or "broadcast", systems were not amenable to implementations of adaptive array technology.

Accordingly, a system and related methods enabling adaptive array technology within broadcast wireless communication systems is required, unencumbered by the limitations commonly associated with prior art broadcast systems. Just such a system and related methods are disclosed, below.

SUMMARY

A system and related methods for beamforming in a multi-point communication environment is presented. According to one aspect of the invention, a method comprising identifying one or more target(s) for which a communication signal is intended, identifying one or more other target(s) which may benefit from receipt of the communication signal, and developing a multi-lobe beampattern to transmit the communication signal to the intended target(s) and the identified one or more other target(s).

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION

Figure 1:
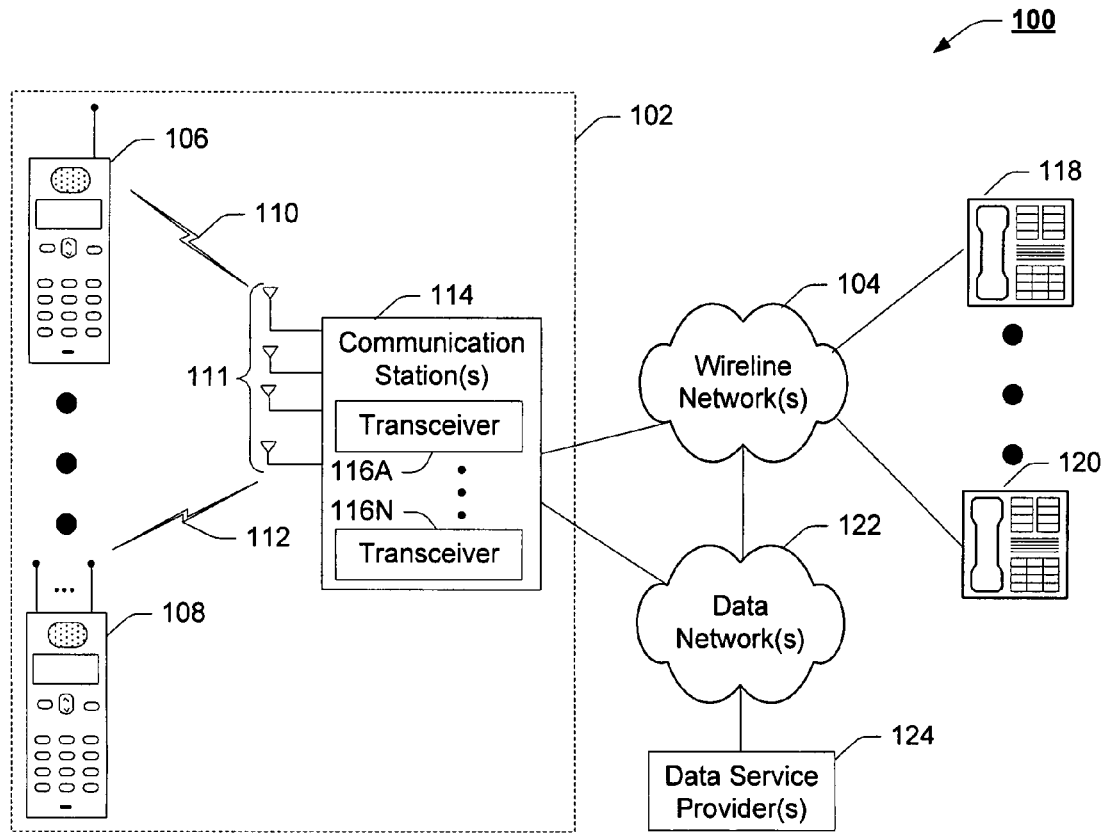
FIG. 1 is a block diagram of an example wireless communication system.

The present invention is directed to a system and related methods of beamforming in a multi-point communications environment, i.e., wherein multiple targets dynamically share physical communication resources. In accordance with one example implementation, the teachings of the present invention are developed within the context of a GPRS system implemented over a TDMA wireless communication system. In this regard, in accordance with one aspect of the present invention to be developed more fully below, a multi-point communication agent is introduced comprising one or more of a clustering engine and/or a beamforming engine is presented.

According to one example implementation, the clustering engine is selectively invoked to analyze spatial signature attributes of one or more target(s) for which a communication link is intended. Given the spatial signature attributes, certain of the target(s) are grouped into clusters and a cluster spatial signature is developed. Once a cluster spatial signature is developed, beamforming engine is selectively invoked to generate weighting value(s) applied to a transmitted signal to establish a communication link beam between the transmitting communicating entity and the target(s) of the cluster(s).

In accordance with another aspect of the present invention, multi-node communications agent generates a multi-node communication beam directing towards intended user (s), avoiding undesired user(s), and nulling interferor(s). In accordance with this aspect of the invention, multi-node communications agent identifies the intended targets (i.e., the current user of the communication channel) as well as the subsequent user for a communication channel, and dynamically modifies signal attributes of the communication channel to direct the communication signal to the intended targets as well as the next user of the channel. In certain implementations, multi-node communication agent identifies undesired user(s) and/or interferors, and modifies the radiation pattern of the multi-node communication beam to avoid and/or null such additional users within the coverage area. Those skilled in the art will appreciate that the teachings of the present invention facilitate adaptive antenna technology in a wireless data services environment and, in this regard, is well-suited to implementation within a GPRS data services system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Example Wireless Communication System

FIG. 1 provides a block diagram of an example communication system 100 in which the teachings of the present invention may well be practiced, in accordance with one example implementation of the present invention. In accordance with the illustrated example implementation of FIG. 1, the communication system 100 includes at least a wireless communication system component 102 comprising one or more user terminal(s) 106, 108 coupled to a wireless communication station 114 through one or more wireless communication links 110, 112, respectively. In accordance with one example implementation, the wireless communication system component 102 is coupled to one or more wireline network(s) 104 to facilitate communication with wireline subscriber units 116 and 120. In addition, wireless communication system 102 may well be coupled to one or more data network(s) 122 to facilitate delivery of enhanced data services from, e.g., data service provider(s) 124.

In accordance with one example implementation, wireless communication system 102 employs a time division multiple access (TDMA) communication protocol in delivery of wireless communication services wherein a communication channel is defined as a timeslot within a carrier frequency. To facilitate wireless communication between communicating entities 106, 108 and 114, each of such entities include at least one transmitter and one receiver, perhaps combined within a transceiver. As shown, certain of the communicating entities may well include multiple transceivers to facilitate multiple simultaneous communication links, e.g., communication station 114 with transceivers 116A . . . N. In addition to delivery of wireless voice communication services, wireless communication system 102 is enabled to delivery enhanced data services such as, general packet radio service (GPRS) in accordance with the TDMA paradigm. Those skilled in the art will appreciate that while the features of the present invention are described within the context of a TDMA-base wireless communication system offering GPRS, the teachings of the present invention are more broadly applicable to the delivery of any information (data, voice, etc.) to multiple target(s) using any of a number of multiple access wireless technologies (e.g., FDMA, CDMA, etc.) without deviating from the spirit and scope of the present invention.

As used herein, the user terminals 106, 108 are intended to represent any of a wide variety of electronic appliances configured for wireless communications including, for example, wireless telephony subscriber units, wireless-enabled computing devices, and the like. In accordance with one example implementation, one or more user terminal(s) 106, 108 are endowed with the multi-point communications agent discussed more fully below to establish a two-way wireless communication link with multiple target(s) (i.e., entities with which two-way communications are established).

Similarly, communication station 114 (also referred to as a basestation) is intended to represent any of a wide variety of communication stations supporting at least TDMA wireless communications. As shown, communication station 114 is endowed with one or more wireless transceivers (transmitter/receiver combination) to facilitate wireless communication with other communicating entities (e.g., subscriber units, wireless electronic appliances, other basestations, etc.) using a wireless communication link. In accordance with the illustrated example implementation, at least one of such transceivers 116A . . . N is a TDMA transceiver. According to one example implementation, at least one of the TDMA transceiver(s) includes GPRS facilities to support the general packet radio service to one or more requesting user terminal(s) 106, 108.

In addition to the conventional point-to-point communication links 110, 112 depicted in FIG. 1, certain of the communicating entities (e.g., communication station(s), user terminals, etc.) of the wireless communication system 102 include multi-point communication resources to establish communication link beam(s) to one or more cluster(s), each cluster comprising one or more target(s). That is, as will be described and illustrated more fully below, one or more of the transceivers comprising wireless user terminals 106, 108 and/or communication station(s) 114 include a multi-point communication agent to facilitate simultaneous transmission to one or more target(s) in one or more cluster(s) using communication link beam(s) generated in accordance with a spatial signature for each of the cluster(s). According to one example implementation, the multi-point communication agent described below facilitates the general packet radio service (GPRS) data services from, e.g., data service provider(s) 124 to user terminals 106, 108 through data network(s) 122 and communication station(s) 114, respectively.

Example Wireless Communication System Transceiver

Figure 2:
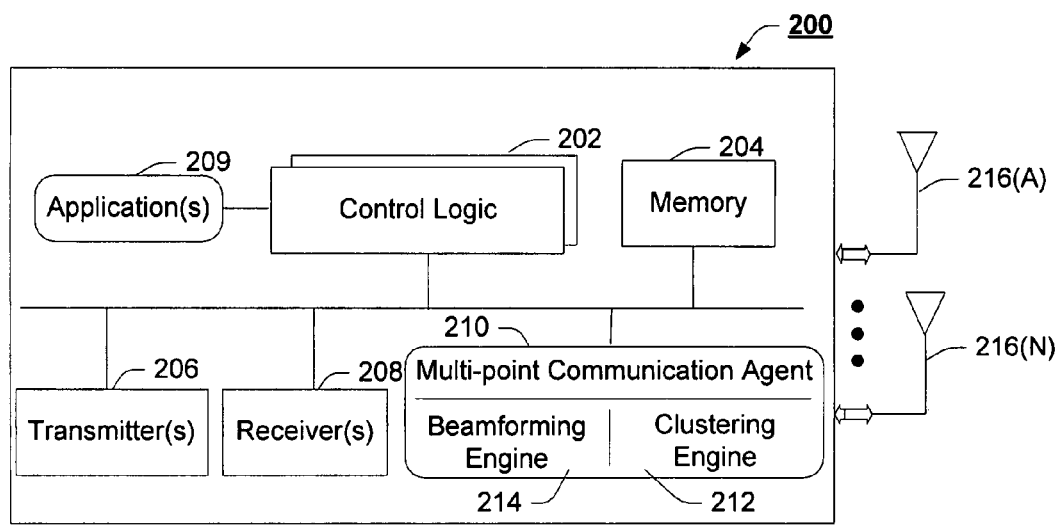
FIG. 2 is a block diagram of an example transceiver including an innovative multi-point communication agent, suitable for use in a user terminal and/or a communication station, incorporating the teachings of the present invention.

Having introduced the operating environment above, FIG. 2 illustrates a block diagram of an example communication system transceiver 200 incorporating an innovative multi-point communication agent, in accordance with one example implementation of the present invention. In accordance with the illustrated example implementation of FIG. 2, the transceiver is depicted comprising control logic 202, memory 204, at least one transmitter 206, at least one receiver 208, a multi-point communications agent 210 including a clustering engine 212 and a beamforming engine 214, one or more antennae 216A . . . N and, optionally, one or more applications 209, each coupled as depicted. But for the introduction of the multi-point communication agent 210 and its constituent elements, transceiver 200 is intended to represent any of a wide variety of transceiver systems known in the art. In this regard, transceiver 200 may well be integrated within a user terminal (e.g., 106, 108) and/or communication station (e.g., 114). In accordance with the illustrated example implementation introduced above, transceiver 200 is a TDMA transceiver and may well include GPRS facilities. In alternate implementations, transceiver 200 is an FDMA and/or CDMA transceiver.

As used herein, control logic 202 controls the overall operation of the transceiver 200. In one implementation, e.g., within a communication station 114, control logic 202 may well be responsive to higher-order application(s) or control logic. In alternate implementations, e.g., within a user terminal, control logic 202 may respond to higher-order applications, control logic, or directly to user input. In either case, control logic 202 controls the communication resources of the transceiver to establish wireless communication link(s) with one or more target(s) and/or one or more cluster(s) of target(s). In this regard, control logic 202 is intended to represent any of a wide variety of control logic known in the art such as, for example, microprocessor(s), microcontroller(s), programmable logic device(s) (PLD), field programmable gate arrays (FPGA), and the like. Alternatively, control logic 202 may well be content which, when executed by a computing appliance, implement the control features described herein.

Applications 209 are intended to denote any of a plurality of content which is executable by control logic 202 to perform some function. In this regard, applications 209 may well represent a series of executable instructions which, when executed, endow transceiver 200 with wireless communication features, or define the multiple access schema of the transceiver (e.g., TDMA, CDMA, etc.). In alternate implementations, aspects of the multi-point communication agent 210, e.g., the clustering engine 212, or the beamforming engine 214, are embodied as a series of executable instructions and are, therefore, denoted generally as applications 209. It will be apparent that the teachings of the present invention may well be practiced without such applications 209.

Memory 204 is also intended to represent any of a wide variety of memory and/or storage devices known in the art. According to one implementation, memory 204 is intended to represent a memory system including a memory controller and one or more volatile and non-volatile memory devices (not specifically denoted). According to one implementation, to be developed more fully below, memory 204 maintains a data structure comprising information enabling the multi-point communication facilities of multi-point communication agent 210. Memory 204 may also be used in support of other communication resources and/or applications 209 of transceiver 200.

But for their interoperation with multi-point communication agent 210, each of the transmitter(s) 206 and receiver(s) 208 are intended to represent such devices or systems commonly known in the art. In this regard, transmitter(s) 206 receives information to be transmitted from an input/output device (not particularly denoted) through control logic 202, processes the information in accordance with the communication scheme employed, and transmits the information through one or more antennae 216 to remote targets. Receivers 208 receive a transmitted signal via antennae 216 and process the received signal to produce a baseband signal which is provided to an input/output device (not shown) via control logic 202. In accordance with the illustrated example implementation introduced above, transmitter(s) 206 and receivers 208 are intended to represent TDMA transmitter(s) and receiver(s), respectively.

As introduced above, the multi-point communications agent 210 enables the transceiver to communicate with multiple target(s) (user(s), transceiver(s), etc.) over a single communication channel (e.g., a timeslot on a particular carrier frequency). In accordance with the illustrated example implementation, multi-point communication agent 210 is presented comprising one or more of clustering engine 212 and/or beamforming engine 214. To facilitate the multi-point communication introduced above, multi-point communication agent 210 identifies a set of targets (e.g., user terminals, communication stations, etc.), groups the targets into a cluster and develops a spatial signature for the cluster. Once the spatial signature is identified, multi-point agent 210 dynamically generates a wireless communication link beampattern to transmit the signal to each of the target(s) within the target cluster(s). In accordance with one aspect of the present invention to be developed more fully below, multi-lobe beampatterns may be generated, wherein one (or more) lobe(s) is directed to the intended recipient of the present signal on the communication channel, and another (one or more) lobe(s) is directed to the next user(s) of the communication channel. In addition to directing communication channel energy towards intended user(s), communication agent 210 may also identify undesired user(s) and/or interferors and modify the signal attribute(s) of the transmitted communication channel to avoid and/or null such additional user(s). Receipt of the signal by the subsequent user of the communication channel instructs the transceiver associated therewith that they own the next instance of the communication channel.

In accordance with the illustrated example implementation introduced above, multi-point communication agent 210 facilitates enhanced data services for multiple target(s). Accordingly, for ease of explanation and not limitation, the teachings of the present invention will be developed more fully in the context of the delivery of GPRS services to targets using a wireless communication channel. Under such an example implementation, up to eight (8) targets may share the same timeslot/frequency allocation from among eight (8) timeslots of a large number of carrier frequencies of a TDMA implementation. Those skilled in the art will appreciate, from the description to follow, that the teachings of the present invention are readily portable to other wireless communication schemes such as, for example, FDMA and/or CDMA architectures.

In accordance with one example implementation of the present invention, clustering engine 212 identifies the intended target(s) of a signal and groups them into one or more cluster(s) based, at least in part, on certain identified spatial signature attribute(s) of the intended target(s). According to one implementation, the spatial signature attributes include the angle of arrival of a signal from a given target. In other, perhaps more advanced implementations, performance characteristics of the targets are measured at the antennae 216 and are used by clustering engine 212 as the spatial signature attributes.

Given the spatial signature attributes, clustering engine 212 determines which targets are closest to one another, and groups such targets into cluster(s) of close spatial signatures. Within each cluster of target(s), clustering engine 212 develops a spatial signature for the cluster as a whole, and develops signal "weights" which are applied by beamforming engine 214 to generate a beampattern to the targets within the cluster(s). That is, clustering engine 212 develops a spatial signature for several users/targets within a cluster, i.e., a cluster spatial signature.

Over time, clustering engine 212 allocates and reallocates the targets within a cluster to the same physical channel, and allocate the targets in different clusters to different physical channels. According to one implementation, clustering engine 212 continues to monitor the spatial signature attribute(s) of the target(s) within the various clusters and reallocates them to different physical channels if their spatial signature attributes become significantly closer to the cluster of its occupant targets than to the targets sharing its original physical channel.

According to one implementation, clustering engine 212 may well modify the number of physical channels applied to the delivery of enhanced data services (e.g., GPRS services), and modify cluster groupings accordingly. In one such implementation, during periods of high voice traffic, the GPRS system is afforded fewer channels to accommodate the heightened voice traffic. Having generally introduced the features of clustering engine 212, those skilled in the art will appreciate that there are a number of ways in which the general inventive process may well be implemented, a couple of such processes are detailed more fully below with reference to FIGS. 6 and 7.

Once the cluster(s) of target(s) are formed, control logic 202 selectively invokes an instance of beamforming engine 214 to apply the developed weights to the transmit signal associated with the communication channel, dynamically generating a beampattern for the wireless communication link to the target(s) within the cluster(s). According to one example implementation, beamforming engine 214 includes a linear filter that accepts a weighting value and adjusts an attenuation and phase applied to the signal transmitted from one or more of the antennae 216 to effect the desired beampattern. In alternate implementations, digital signal processor(s) may well be used to modify the spatial beampattern based, at least in part, on the weighting values developed from the spatial signature attributes of the target(s). In either case, the beamforming engine 214 selectively modifies the transmitted signature to effectively establish a wireless communication link to multiple targets of the same signal.

Those skilled in the art will appreciate, given the foregoing, that multi-point communication agent 210 is particularly useful in that it allows a communicating entity to transmit with a single, optimized beampattern towards a group of targets sharing a physical channel. Such an optimized beampattern effectively increases the energy received by the targets while reducing the total transmitted energy, or the energy received by unintended target(s).

Example Data Structure(s)

Figures 3, 4:
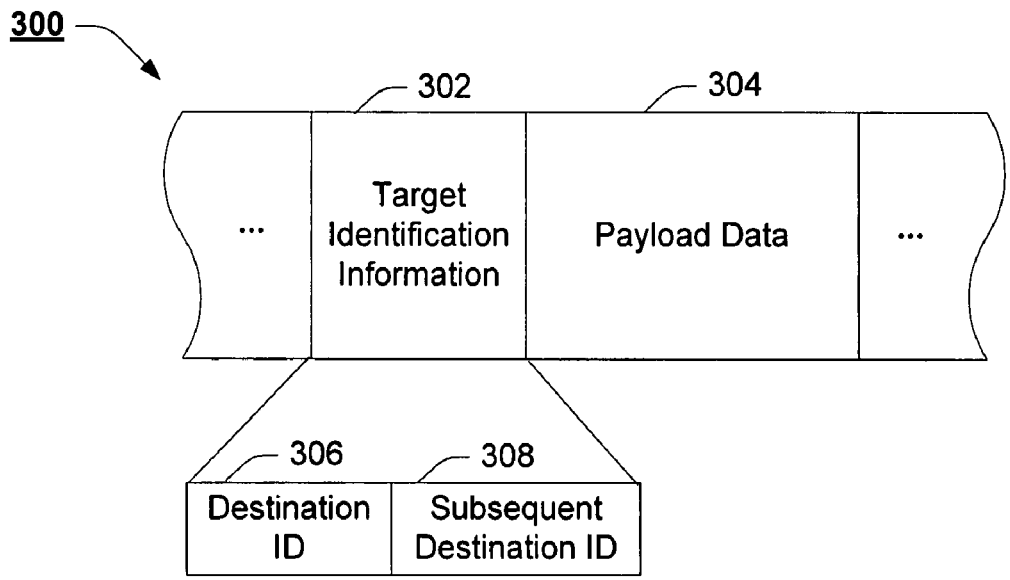
FIG. 3 is a graphical illustration of an example datagram suitable for use in the multi-point communication environment.
FIG. 4 is a block diagram of an example data structure, suitable for use by the multi-point communication agent.

FIG. 3 graphically illustrates a datagram suitable for use in accordance with the teachings of the present invention. As introduced above, one example implementation of the present invention is in the support of a wireless data network such as, e.g., a GPRS system. To identify intended targets of a wireless communication signal, clustering engine 212 analyzes at least a subset of the signal to be transmitted to identify such targets. In accordance with the GPRS implementation introduced above, clustering engine 212 analyzes at least a subset of content of packets received for transmission to identify target(s) for the packets in identifying targets and for use in cluster development. An example of packet, or datagram, suitable for use in accordance with the clustering engine 212 is presented with reference to FIG. 3.

In accordance with the illustrated example implementation of FIG. 3, a datagram 300 includes at least target identification information 302 and payload data 304. In accordance with one example implementation, the target identification information 302 includes at least a destination identifier 306. As used herein, the destination identifier 306 may well include a myriad of information which uniquely identifies a target and/or a cluster of targets to the clustering engine 212. According to one example implementation, for example, the destination identifier includes one or more of a destination address, an electronic serial number, a telephone number, a media access control (MAC) address, and the like. Those skilled in the art will appreciate that such identifiers may well be comprised of alphanumeric characters and/or non-alphanumeric characters.

According to one example implementation, to be developed more fully below, the target identification information also includes a subsequent destination identifier field 308. In accordance with this aspect of the present invention, clustering engine 212 identifies the next user(s) of a particular channel from information provided in the subsequent destination identifier field 308, and develops a spatial signature for such user(s) as well. Beamforming engine 214 then transmits a beampattern (which may, of course, include multiple lobes) directed towards the intended target(s)/cluster(s) as well as the next user(s) of the communication channel denoted by the information in the subsequent destination field 308. In this regard, multi-point communication agent 210 notifies a target that they will be the subsequent user of the communication channel using the same communication channel currently employed by one or more target(s) for GPRS data services.

FIG. 4 graphically illustrates an example data structure for maintaining clustering information, in accordance with one example implementation of the present invention. In accordance with the illustrated example implementation of FIG. 4, a data structure 400 is presented comprising a target identifier field 402, a cluster identifier field 404, an attenuation field 406, a phase field 408, and a spatial signature attributes field 410. According to one example implementation, this information is maintained for each of a plurality of antennae 412. The target identifier field 402 includes information denoting the particular target and, as above, may well include an electronic serial number, a telephone number, a MAC address, an internet protocol (IP) address, and the like. The cluster information field 404 denotes which cluster the target is assigned. In accordance with the illustrated example embodiment, the attenuation and phase fields 406, 408 include elements of the weight value developed by clustering agent 212 based, at least in part, on the identified spatial signature attributes associated with the target and antenna. In alternate implementations, a single value is used for the weighting value, whereupon that weighting value is interpreted by the beamforming engine 214 to modify one or more of the transmission signal attributes (e.g., attenuation and phase). The spatial signature attributes field 410 comprises information identifying each target at the antenna 216. According to one implementation, the attribute information may well comprise signal attribute information (e.g., angle of arrival, etc.), while in alternate implementations the attribute information may well comprise target performance information (e.g., SINR, BER, FER, RSSI, etc.).

As used herein, the size and complexity of the data structure(s) used to implement the aforementioned mobility management features of communications agent 314 depend on the network element in which the agent is deployed. As used herein, data structure 400 may well be maintained within memory elements (not shown) of the multi-point communication agent 210, or within memory 204 of the transceiver 200 itself.

Example Implementation and Operation

Having introduced the operational and architectural elements of the present invention, above, reference is next directed to FIGS. 5-10, wherein certain aspects of the present invention are developed in greater detail.

Facilitating Communication in a Multi-Point Communication Environment

Figure 5:
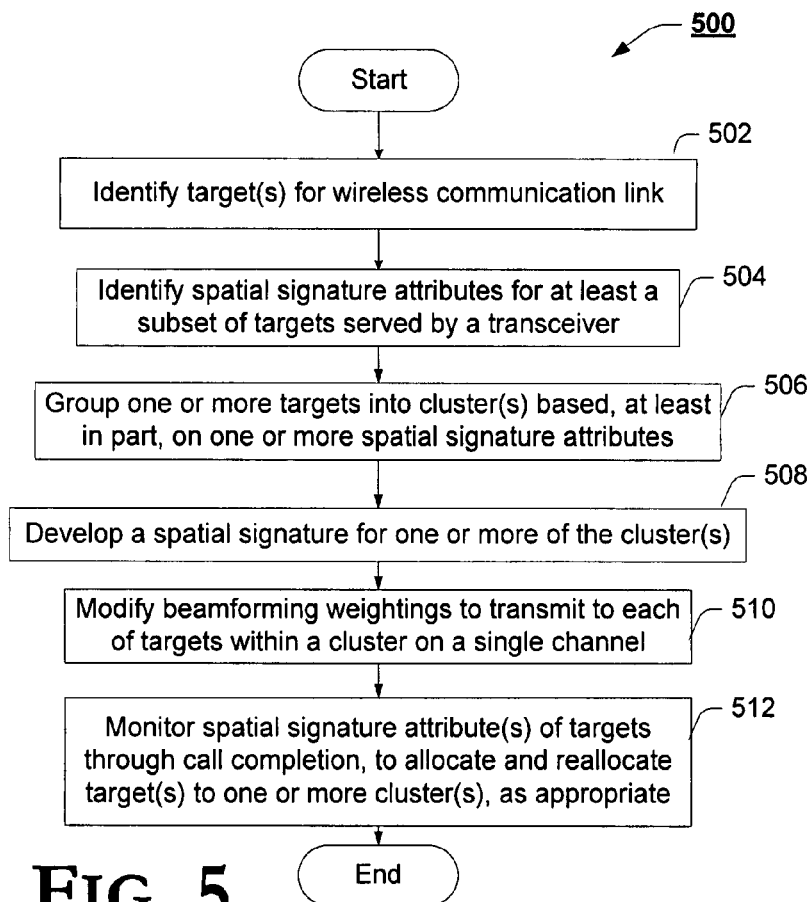
FIG. 5 is a flow chart of an example method of beamforming in a multi-point communication environment, in accordance with one aspect of the present invention.

FIG. 5 illustrates a flow chart of an example method for establishing and facilitating communication resources in a multi-point communication environment. That is, FIG. 5 illustrates a method for establishing a two-way communication link between a transmitter and multiple target(s), in accordance with one aspect of the present invention, e.g., to facilitate delivery of enhanced data services in a virtual packet-switched network environment of GPRS. As introduced above, to facilitate the sharing of physical communication resources in support of the virtual packet-switched network, communications agent 210 clusters target(s) of the (e.g., GPRS) service with similar spatial signatures, and employs adaptive antennae technology to selectively establish a communication link with each of the clusters.

In accordance with the illustrated example implementation of FIG. 5, the method begins with block 502 where transceiver 200 identifies one or more target(s) for a wireless communication link. As introduced above, according to one example implementation, clustering engine 212 identifies such targets through analysis of the target identification information, e.g., within datagram 300.

In block 504, having identified one or more target(s) for the communication link, multi-point communication agent 210 of transceiver 200 identifies a spatial signature for at least a subset of the targets served by the transceiver. More particularly, in accordance with one example implementation, clustering engine 212 identifies one or more spatial signature attributes such as, for example, signal attributes (e.g., angle of arrival) and/or target performance attribute(s) (e.g., RSSI, SINR, SNR, BER, FER, etc.) at each of the one or more antennae 216.

In block 506, having identified spatial signature attributes for at least a subset of the target(s), clustering engine 212 groups one or more of the target(s) into cluster(s) of target(s) based, at least in part, on one or more of the identified spatial signature attributes. According to one example implementation, target(s) with similar spatial signature attributes are grouped together in a single cluster. Each of the target(s) within a cluster will receive the same information via the same physical channel (timeslot/frequency combination).

In block 508, clustering engine 212 develops a spatial signature for each of the one or more cluster(s), each cluster comprising one or more target(s) based, at least in part, on the spatial signature attributes of the constituent target(s). That is, clustering engine 212 develops a "cluster" spatial signature based, at least in part, on the spatial signature attributes of at least a subset of the target(s) comprising the clusters. From the cluster spatial signature, clustering engine 212 develops weight values for use in accordance with conventional beamforming techniques to spatially direct the transmission of the communication link to the targets within the cluster(s).

In block 510, clustering engine 212 provides the weighting values to the beamforming engine 214, which applies the weighting values to the transmit signal to spatially direct the transmission towards the cluster(s), reducing transmission to and interference resulting in unintended targets. According to one example implementation, described above, beamforming engine 214 includes linear filters which accept the weighting values and modify transmit signal characteristics (e.g., phase/attenuation) in a known fashion to generate the desired beampattern to the cluster(s).

In block 512, clustering engine 212 continues to monitor the spatial signature attributes of the target(s), and the performance of the system as described above, to improve the performance characteristics of the multi-point communication system.

Figure 9:
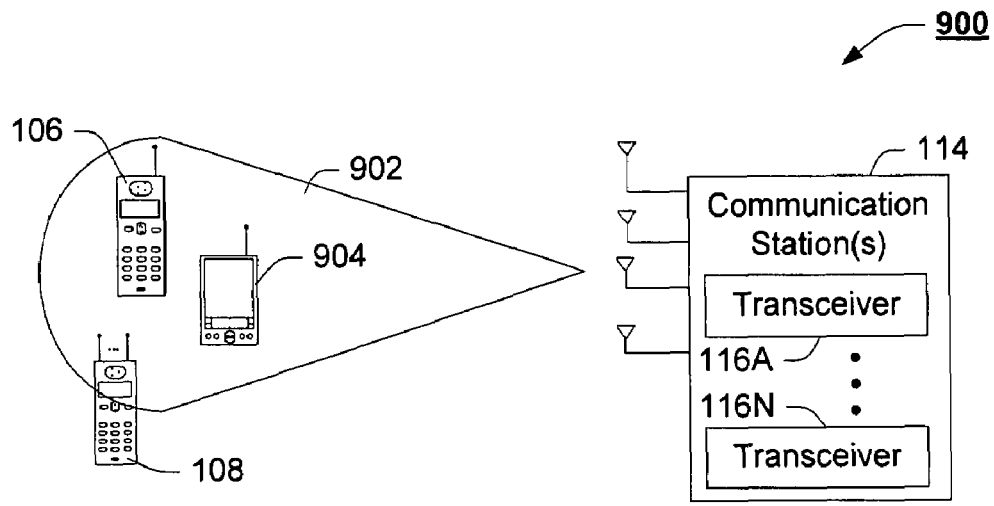
FIG. 9 graphically illustrates a beam representing a wireless communication link from a transceiver to a dynamically selected set of target(s) forming a cluster, in accordance with one aspect of the present invention.

Turning briefly to FIG. 9, a graphical illustration of establishing a communication link beam to multiple target(s) within one or more cluster(s) is presented, in accordance with one example implementation of the present invention. In accordance with the illustrated example implementation of FIG. 9, a transceiver 116 endowed with multi-point communication agent (not shown) within communication station 114 establishes a communication link beam 902 over a common communication channel with a cluster of targets 106, 108 and 904 based, at least in part, on a cluster spatial signature. As shown, the targets may well comprise a wireless subscriber unit 106, a spatial diversity wireless subscriber unit 108, a wireless-enabled electronic appliance 904, and the like. It should be appreciated that although illustrated as cluster of user terminals, a user terminal (e.g., 108) may well transmit to a cluster of other targets (e.g., wireless terminal(s) and or basestations) utilizing the teachings of the present invention. That is, as introduced above, multi-point communication agent 210 may well be integrated with and utilized by wireless transceivers resident within a subscriber unit and/or a communication station.

Establishing Clusters of One or More Target(s)

Figure 6:
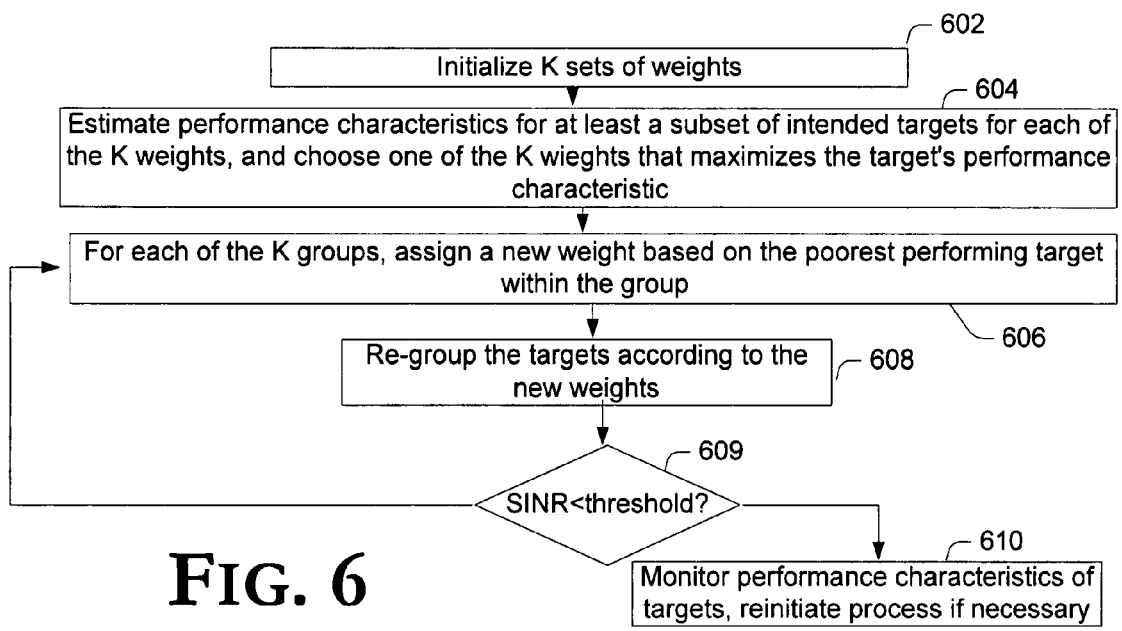
FIG. 6 is a flow chart of an example method of dynamically clustering target(s) for purposes of beamforming, in accordance with one aspect of the present invention.

Turning to FIG. 6, an example method for identifying and selecting targets for a cluster is presented, in accordance with one example implementation of the present invention. In accordance with the illustrated example implementation of FIG. 6, the method begins with block 602 where clustering engine 212 begins with an initial set of K beamforming weights. In accordance with one example implementation, the K beamforming weights are predetermined and maintained within the multi-point communication agent 210. In alternate implementations, the initial set of K beamforming weights are based, at least in part, on prior cluster groupings maintained in data structure 400. Mathematically, the weights may be represented as:

$$w_{i,n} = 1, \ldots, K \quad (1)$$

where: i indexes the weight group, and n indexes the process iteration.

In block 604, clustering engine 212 identifies spatial signature attributes for each of the targets. In accordance with the illustrated example implementation, clustering engine 212 measures one or more performance characteristics of each of the targets at each of the antennae 216. As introduced above, any of a wide variety of performance characteristics may well be used such as, for example, one or more of RSSI, SINR, SNR, BER, FER, etc. In accordance with the illustrated example implementation, clustering engine 212 measures the signal to interference and noise ratio (SINR) (eq. 2) for each of the targets for each of the K weights, and find the weight that produces the maximum SINR and assign that target to that cluster group.

$$SINR_{i,k} = f(w_i, target_k) \quad (2)$$

In this regard, K the targets are initially grouped into K clusters.

In block 606, for each of the K clusters, clustering engine 212 assigns a new weight based on the performance characteristics of the targets within the group. According to one example implementation, for example, clustering engine 212 finds the target with the smallest SINR in the cluster and assigns a Least-Squares weight (eq. 3) for that user to the cluster. While this weighting may not be optimal for all targets within the group, it ensures that the target with the smallest SINR is minimally accommodated with the developed beampattern.

$$w_{i,n+1} = Rzz^{-1} Rza_{i,min} \quad (3)$$

where: $i_{min} = \min(SINR_K \in G_I)$

In block 608, once the K new weights are developed, the targets are re-grouped according to the weights that provide the best SINR performance attribute for the targets, as expressed below in eq. 4.

$$G_i = \{target_k | SINR_{i,k} \geq SINR_{j,k}, j=1, \ldots, K\} \quad (4)$$

In block 609, if the minimum SINR for each group is less than or equal to the minimum SINR for the previous group, the process enters a monitoring mode block 610. Otherwise, the process continues in an iterative fashion until no substantial improvement in the performance characteristics of the targets can be achieved.

Figure 7:
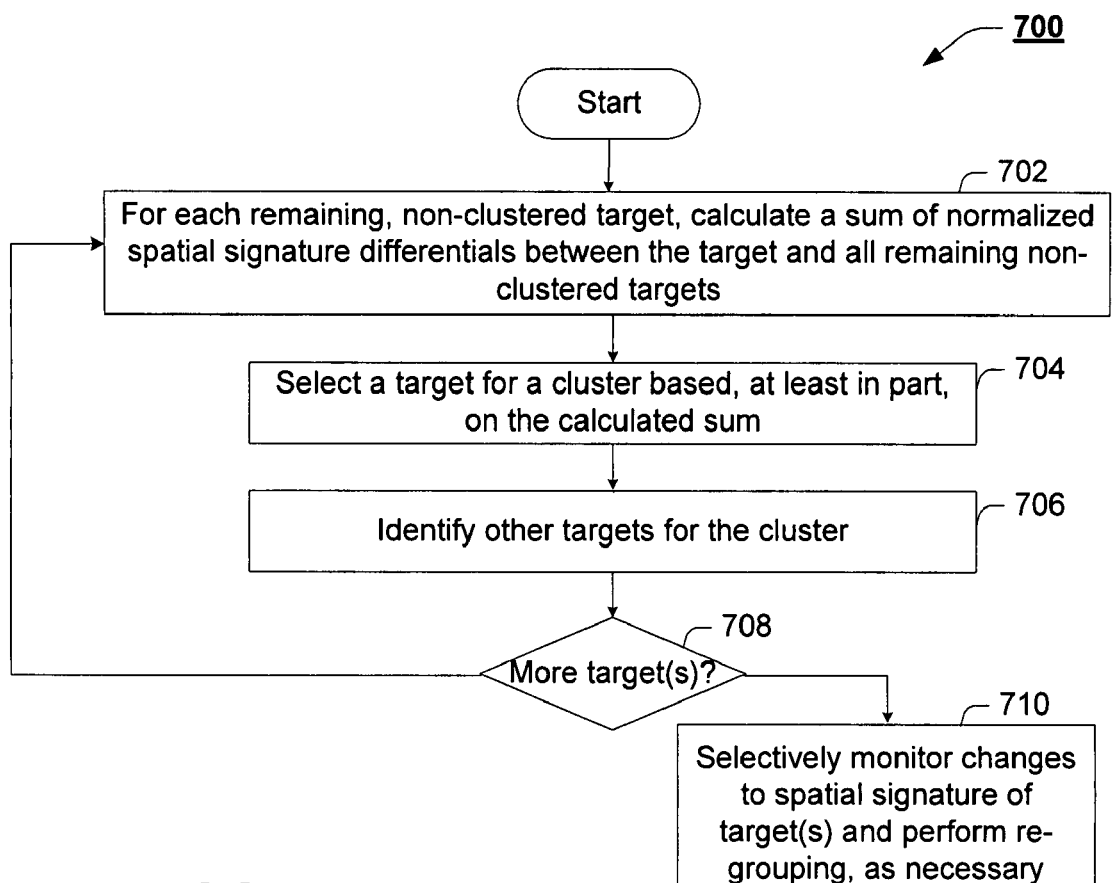
FIG. 7 is a flow chart of an example method of dynamically clustering target(s) for purposes of beamforming, in accordance with another example implementation of the present invention

In FIG. 7 a flow chart of another example method for determining the occupancy of target clusters is presented, in accordance with one aspect of the present invention. In accordance with the illustrated example implementation of FIG. 7, the method begins in block 702 wherein, for each remaining, non-clustered target, clustering engine 212 calculates a composite spatial signature difference differential. According to one example implementation, the composite spatial signature difference differential is a sum of normalized spatial signature distance differentials between the target and all remaining non-clustered targets. In accordance with this example implementation, clustering engine 212 calculates a distance ($d_{i,j}$) of its normalized spatial signature ($a_i$) to the normalized spatial signature ($a_j$) of each other target, where the distance is calculated in accordance with equation 5.

$$d_{i,j} = |a_i - (a_i'^* a_j) a_j| \quad (5)$$

From each of the individual normalized distance differentials (5), clustering engine 212 calculates a composite spatial signature distance differential as the sum, or total distance to all other targets (j), according to:

$$d_i = \Sigma(d_{i,j}) \text{ over all targets } j. \quad (6)$$

In block 704, clustering engine 212 identifies an anchor target for a cluster based, at least in part, on the calculated composite spatial signature distance differentials of the targets. According to one example implementation, clustering engine 212 identifies the target with the smallest composite difference differential ($d_{i,j}$) and assigns it as the anchor of a developing cluster of targets.

In block 706, clustering engine 212 completes the cluster by identifying an additional N−1 targets to complete the cluster, where a cluster has a size of N targets. According to one example implementation, the next N−1 targets are selected as those targets with the next smallest composite distance differentials that do not exceed a minimum distance differential ($d_{min}$). That is, in order to cluster targets with similar spatial signatures, targets that deviate from one another by too large a distance, even if they do represent the next smallest composite distance differential will not be clustered together. In such a case, target(s) that exceed this distance threshold ($d_{min}$) would be assigned to a different cluster of one or more target(s) with similar spatial signatures, as quantified by the total distance figure defined above. In this regard, clusters of 1–N targets are possible under the teachings of the present invention.

According to one implementation, clustering engine 212 develops a cluster spatial signature from the composite spatial signature distance differentials of the target(s) within a cluster. According to one implementation, the composite spatial signature distance differential of the anchor target is used as the cluster spatial signature. In accordance with one example implementation, introduced above, clustering engine 212 provides beamforming engine 214 with the spatial signature associate with each of the generated clusters to enable beamforming engine to selectively modify one or more attributes of the transmission to selectively direct the transmission beam towards target(s) within one or more clusters.

In block 708, clustering engine 212 determines whether there are any remaining, non-clustered targets. If so, the process continues with block 702 wherein clustering engine recalculates the composite spatial signature distance differential for each remaining target with respect to the other remaining (i.e., yet unclustered) targets, and additional clusters are developed.

If, in block 708, all target(s) have been assigned to clusters, the process continues with block 710 wherein clustering engine 212 selectively monitors changes to the spatial signature attribute(s) of the target(s), and performs re-grouping of targets as necessary. According to one example implementation, if any cluster has a vacancy (e.g., less than N targets) clustering engine 212 calculates, for each target assigned to other clusters, the average distance to each target member of the under-populated cluster. This value is compared with the average distance to all other clusters with a vacancy and assign the target with the lowest average distance to that cluster. For each pair of targets in different clusters, compare the average distance of each to targets in their own cluster to average distance of targets in the other's cluster. If switching the target(s) lowers the composite spatial signature difference differential of each, then switch the target's clusters.

According to yet another example implementation, spatial signature attributes are derived for each of the target(s) using vector quantization techniques. An example of such clustering methods is presented in U.S. Pat. No. 6,185,440 entitled Method for Sequentially Transmitting a Downlink Signal from a Communication Station that has an Antenna Array to achieve an Omnidirectional Radiation, by Barrat et al., and commonly assigned to the assignee of the present invention, is hereby incorporated by reference for all purposes.

Multi-Node Beamforming

Figure 8:
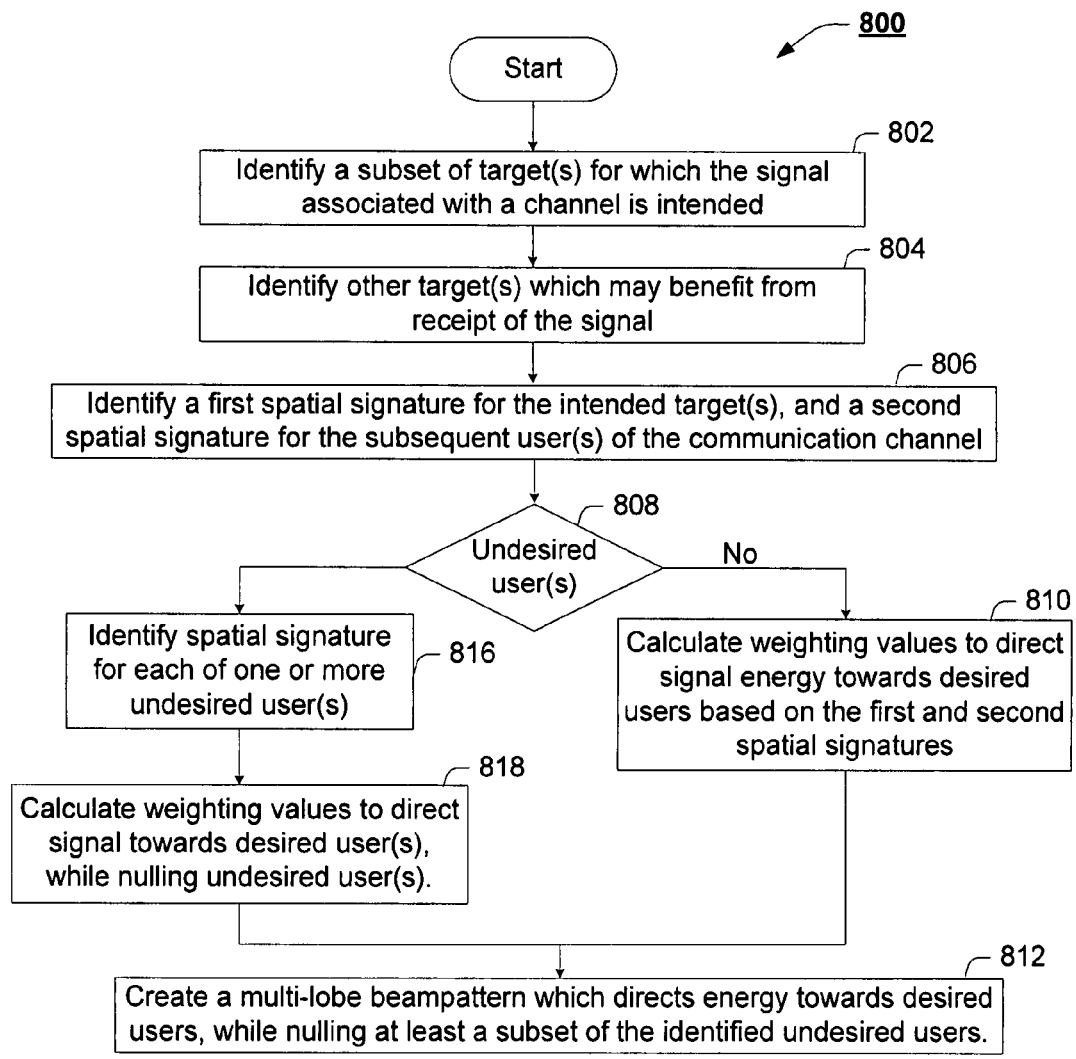
FIG. 8 is a flow chart of an example method of dual beamforming, according to one aspect of the present invention.

Turning to FIG. 8, a flow chart of an example method for multi-node beamforming in a multi-point communication environment is presented, in accordance with another aspect of the present invention. In accordance with one example implementation, multi-point communications agent 210 establishes a multi-node communication link beam in support of wireless data services such as, for example, GPRS data services, wherein it is desirable to transmit the same signal to multiple target(s) (i.e., that are not clustered together) or, to multiple cluster(s). In the illustrated GPRS implementation, for example, it may be desirable to transmit a signal for a communication channel not only to an intended recipient of the signal, but also to target(s) identified as the next user(s) of the transmission channel (e.g., as identified from content within a datagram 300). Just such a method is presented below.

Accordingly, the method of FIG. 8 begins with block 802 wherein clustering engine 212 identifies a subset of targets for which the signal associated with a particular channel is intended. As introduced above, clustering engine 212 may well utilize information contained within the received signal for transmission, or information contained within a received packet datagram 300 (e.g., target identification information) to identify the intended target(s).

In block 804, clustering engine 212 identifies additional target(s) that may also benefit from receipt of the signal. As provided above, in accordance with the example GPRS implementation, it may be beneficial for the next user(s) of the communication channel (i.e., timeslot/frequency combination) to receive the signal as well. According to one example implementation, introduced above, clustering engine 212 identifies the next user from the target identification information 302 of the datagram received for transmission.

In block 806, clustering engine 212 identifies a first spatial signature for the intended target(s) of the pending transmission, and a second spatial signature for the other identified target(s) (i.e., the next user(s)) of the communication channel. In accordance with the teachings of the present invention, the targets may well be individual transceivers or clusters of targets, in which case a first cluster spatial signature and a second cluster spatial signature is identified, as described above. In block 808, multi-point communication agent 210 determines whether there are any undesired user(s) and/or interferors within the coverage area of the host transceiver. If not, beamforming engine 214 calculates weighting values to direct signal energy towards the desired user(s), i.e., the intended target(s) as well as the next user of the communication channel, based, at least in part, on the first and second spatial signatures. If, for example, there are two desired targets with spatial signatures a1 and a2, clustering engine 212 forms a linear superposition of two weights w1 and w2, respectively, calculated as follows:

$$w1 = PE[a2'a2]a1$$

$$w2 = PE[a1'a1]a2 \qquad (7)$$

where:

a1 and a2 are N×1 vectors;

N denotes the number of antennae 216 associated with the transceiver;

[a2' a2] is the outer product of a2 with itself, i.e., an N×N matrix;

[a1' a1] is the outer product of a1 with itself, also an N×N matrix; and

PE denotes a pseudo-inverse operation.

Thus, the weights used for transmission of the communication channel are then:

$$(alpha1*w1)+(alpha2*w2) \qquad (8)$$

where alpha1 and alpha 2 are scalars controlling the intended power to be received by the targets.

The developed weights are applied to the transmitted signal to create a multi-lobe beampattern which directs energy towards the desired users, block 812. According to certain implementations, in addition to directing energy towards desired users, i.e., the intended target(s) and the next user(s) of the communication channel, communications agent 210 may well modify the beampattern to avoid undesired user(s) and/or null interferors.

With continued reference to FIG. 8, if undesired user(s) are identified within block 808, the process continues with block 816 wherein, clustering engine 212 is invoked to identify a spatial signature for each of such undesired user(s), block 816. According to one example implementation, clustering engine 212 may well utilize any of the one or more methods described above to identify the spatial signature for such undesired user(s), e.g., u1, u2, ... uN.

In block 818, beamforming engine 214 takes the undesired user spatial signature and calculates weighting value to modify one or more attributes of the transmitted signal to target the desired users, while avoiding or nulling undesired user(s). According to one example implementation, beamforming engine 214 establishes the matrices:

$$M\_a=[a2'a2]+xa1[u1'u1]+xa2[u2'u2]+\ldots+xaN[uN'uN]$$

$$M\_b=[a2'a2]+xb1[u1'u1]+xb2[u2'u2]+\ldots+xbN[uN'uN] \quad (9)$$

where xa1 ... xaN, xb1 ... xbN are scalar constants that control the degree of nulling towards each undesired user and/or interferer. Accordingly, the weighting values of equation (7), above, are modified as:

$$w1=PE[M\_a]a1$$

$$w2=PE[M\_b]a2 \quad (10)$$

Once the modified weighting values are generated, block 818, the process continues with block 812, where a multi-lobe beampattern is generated which directs energy towards desired user(s), while nulling at least a subset of the identified undesired users. In this regard, multi-point communications agent 210 facilitates communication of payload to an intended recipient, while simultaneously granting access to the uplink channel to the next user of the channel.

Figure 10:
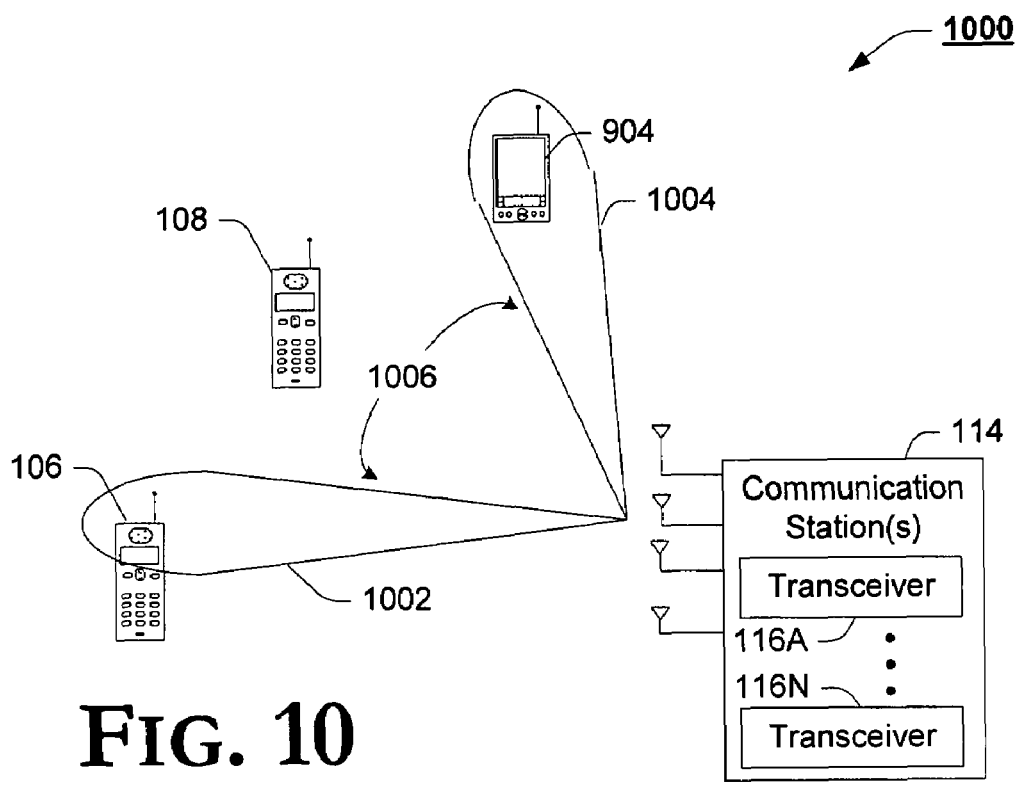
FIG. 10 graphically illustrates a dual-beam representing a wireless communication link from a transceiver to at least two clusters, in accordance with one aspect of the present invention.

With reference to FIG. 10, a graphical illustration of a multi-node communication link beam is depicted, in accordance with one example implementation of this aspect of the present invention. More particularly, the graphical illustration of FIG. 10 illustrates a communicating entity, a basestation 114 in this example implementation, that establishes a multi-node communication link beam between an intended target 106 of the communication channel, and a next user 904 of the communication channel. That is, each of the two target(s) 106 and 904 receive a common signal via two separate communication link beams, e.g., beam 1002 and beam 1004. According to one example implementation, the intended target 106 (e.g., corresponding to the destination identifier in the datagram 300) can access and/or utilize the "payload" of the communication channel, while the next user 904 is merely notified that they are the next owner of the channel, providing access to the uplink element of the communication channel.

In addition to the affirmatively directing energy towards the intended target(s) and the subsequent user(s) of the communication channel, communications agent 210 may well modify one or more attributes of the transmitted signal to avoid, or null, one or more undesired user(s). In FIG. 10, for example, communications agent 210 has identified user 108 as an undesired user, and nulls the communication channel transmission in an area 1006 directed towards the undesired user.

ALTERNATE EMBODIMENT(S)

Figure 11:
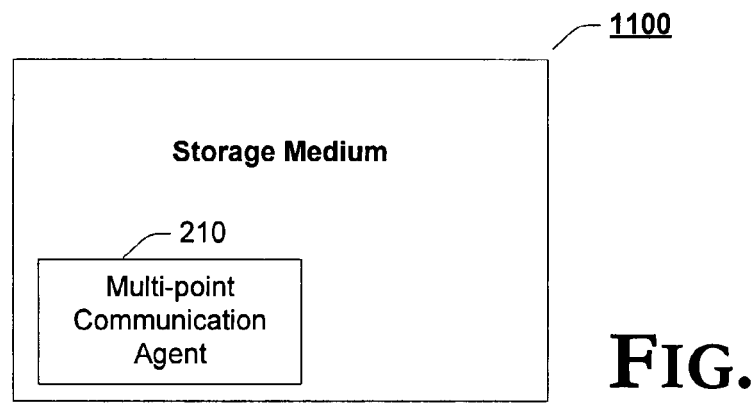
FIG. 11 is a block diagram of an example storage medium comprising a plurality of executable instructions which, when executed, cause an accessing machine to implement one or more aspects of the innovative communication agent of the present invention, in accordance with an alternate embodiment of the present invention.

FIG. 11 is a block diagram of an example storage medium comprising a plurality of executable instructions which, when executed, cause an accessing machine to implement one or more aspects of the innovative multi-point communication agent 210 of the present invention, in accordance with an alternate embodiment of the present invention.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components, such as those shown in FIGS. 1 and 2, or may be embodied in machine-executable instructions, which may be used to cause a general-purpose or special-purpose processor or logic circuits programmed with the instructions to perform the steps. Alternatively, the steps may be performed by a combination of hardware and software. The steps have been described as being performed by either the base station or the user terminal. However, any steps described as being performed by the base station may be performed by the user terminal and vice versa. The invention is equally applicable to transceivers and/or systems in which terminals communicate with each other without either one being designated as a base station, a user terminal, a remote terminal or a subscriber station. The invention can further be applied to a network of peers.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Importantly, while the present invention has been described in the context of a wireless communication system for portable handsets, it can be applied to a wide variety of different wireless systems in which data are exchanged. Such systems include voice, video, music, broadcast and other types of systems without external connections. The present invention can be applied to fixed remote terminals as well as to low and high mobility terminals. Many of the methods are described in their most basic form but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

What is claimed is:

1. A subscriber unit comprising:
   wireless communication resources, to selectively transmit a wireless communication signal via an antenna array; and
   a communications agent, coupled with the wireless communication resources, to identify one or more target(s)

for which the communication signal is intended as well as one or more other target(s) which may also benefit from receipt of the communication signal, and to develop a multi-lobe beampattern to transmit the communication signal to the intended target(s) and the identified one or more other target(s).

2. A subscriber unit according to claim 1, wherein the communications agent analyzes a received datagram for transmission in the communication signal for target information.

3. A subscriber unit according to claim 2, wherein the target information includes at least information denoting the intended target(s) and information denoting other target(s) which may benefit from receipt of the communication signal.

4. A subscriber unit according to claim 2, wherein the target information comprises one or more of an electronic serial number (ESN), a media access control (MAC) address, an internet protocol (IP) address, a telephone number, and/or an application identifier.

5. A subscriber unit according to claim 2, wherein the communications agent identifies a first spatial signature associated with the one or more intended target(s) and a second spatial signature associated with the identified one or more other target(s).

6. A subscriber unit according to claim 5, the communications agent comprising:
   a beamforming engine, to modify one or more transmission characteristics of the communication signal based, at least in part, on the identified first and second spatial signatures.

7. A subscriber unit according to claim 6, wherein beamforming engine modifies one or more of a amplitude weight value and/or a phase weight value associated with each of the one or more antennae in the antenna array to generate the developed beampattern.

8. A subscriber unit according to claim 7, wherein the communications agent identifies a spatial signature associated with one or more undesired users of the communication signal, wherein beamforming engine modifies one or more attributes of the multi-lobe beampattern to null at least a subset of the undesired users.

9. A subscriber unit according to claim 1, further comprising: a memory system having stored therein content; and control logic, coupled with the memory system, to access and execute at least a subset of the content to implement the communications agent.

10. A transceiver comprising a communications agent, the communications agent including:
   a clustering engine to identify one or more target(s) for which a wireless communication signal is intended as well as one or more other target(s) which may also benefit from receipt of the communication signal; and
   a beamforming engine to develop a multi-lobe beampattern to transmit the communication signal to the intended target(s) and the identified one or more other target(s).

11. A transceiver according to claim 10, wherein the clustering engine analyzes a received datagram for transmission in the communication signal for target information.

12. A transceiver according to claim 11, wherein the target information includes at least information denoting the intended target(s) and information denoting other target(s) which may benefit from receipt of the communication signal.

13. A transceiver according to claim 11, wherein the target information comprises one or more of an electronic serial number (ESN), a media access control (MAC) address, an internet protocol (IP) address, a telephone number, and/or an application identifier.

14. A transceiver according to claim 11, wherein the clustering engine identifies a first spatial signature associated with the one or more intended target(s) and a second spatial signature associated with the identified one or more other target(s).

15. A transceiver according to claim 14, wherein the beamforming engine modifies one or more transmission characteristics of the communication signal based, at least in part, on the identified first and second spatial signatures.

16. A transceiver according to claim 15, wherein beamforming engine modifies one or more of a amplitude weight value and/or a phase weight value associated with each of the one or more antennae in the antenna away to generate the developed beampattern.

17. A transceiver according to claim 16, wherein the clustering engine identifies a spatial signature associated with one or more undesired users of the communication signal, wherein beamforming engine modifies one or more attributes of the multi-lobe beampattern to null at least a subset of the undesired users.

18. A transceiver according to claim 10, further comprising:
   a memory system having stored therein content; and
   control logic, coupled with the memory system, to access and execute at least a subset of the content to implement the communications agent.

* * * * *